(12) United States Patent
Gu

(10) Patent No.: US 8,699,004 B2
(45) Date of Patent: Apr. 15, 2014

(54) DEVICE FOR MOUNTING A GRATING AND A PHOTOSENSITIVE MATERIAL FOR STEREOPROJECTION IMAGING

(76) Inventor: Jinchang Gu, Shanghai (CN)

( * ) Notice: Subject to any disclaimer, the term of this patent is extended or adjusted under 35 U.S.C. 154(b) by 355 days.

(21) Appl. No.: 13/140,290

(22) PCT Filed: Dec. 16, 2009

(86) PCT No.: PCT/CN2009/075651
§ 371 (c)(1),
(2), (4) Date: Jun. 16, 2011

(87) PCT Pub. No.: WO2010/069252
PCT Pub. Date: Jun. 24, 2010

(65) Prior Publication Data
US 2011/0242519 A1    Oct. 6, 2011

(30) Foreign Application Priority Data

Dec. 17, 2008  (CN) .......................... 2008 1 0204796

(51) Int. Cl.
G03B 27/20 (2006.01)
G03B 27/02 (2006.01)
G03B 27/04 (2006.01)
G03B 27/58 (2006.01)
G03B 27/32 (2006.01)

(52) U.S. Cl.
USPC .................. 355/91; 355/22; 355/72; 355/78; 355/95

(58) Field of Classification Search
USPC ................ 355/22, 72–77, 78, 91, 94, 95, 132
See application file for complete search history.

(56) References Cited

U.S. PATENT DOCUMENTS

| | | | | |
|---|---|---|---|---|
| 3,955,163 A | * | 5/1976 | Novak | 355/132 |
| 4,054,383 A | * | 10/1977 | Lin et al. | 355/91 |
| 4,888,488 A | * | 12/1989 | Miyake | 250/492.1 |
| 6,232,023 B1 | * | 5/2001 | Matsuki et al. | 430/22 |
| 6,459,474 B1 | * | 10/2002 | Okada | 355/78 |
| 6,784,979 B2 | * | 8/2004 | Tajima et al. | 355/78 |
| 2008/0084006 A1 | * | 4/2008 | Gao et al. | 264/293 |

* cited by examiner

Primary Examiner — Toan Ton
Assistant Examiner — Christina Riddle

(57) ABSTRACT

A device for mounting a grating and a photosensitive material for stereoprojection imaging, includes: an enlarging-printing platform; and an exposure head positioned above the enlarging-printing platform; wherein the enlarging-printing platform is a chamber structure, and has a plurality of suction holes provided on an upper surface thereof and at least one exhaust port provided on a side connected with an exhaust device; the device for mounting the grating and the photosensitive material for stereoprojection imaging further includes a compressing mechanism connected with the upper surface. The device for mounting the grating and the photosensitive material provides a real-time composite device for developing stereopictures. With the mounting device, the grating and photosensitive photographic paper need either being combined beforehand, or being developed with the grating after exposure. Therefore, the drawback of high crimp ratio of the grating, high difficulty of developing, bad stereoimaging effect, and high cost is overcome.

16 Claims, 1 Drawing Sheet

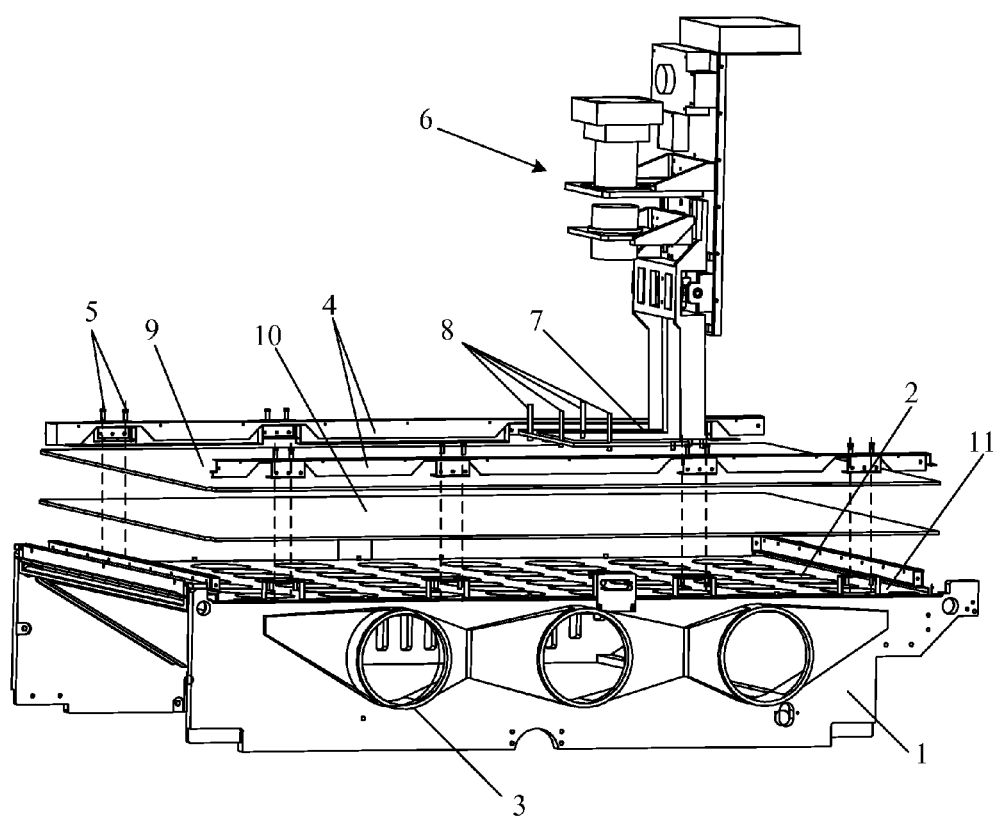

DEVICE FOR MOUNTING A GRATING AND A PHOTOSENSITIVE MATERIAL FOR STEREOPROJECTION IMAGING

BACKGROUND OF THE PRESENT INVENTION

1. Field of Invention

The present invention relates to a device for mounting a grating and a photosensitive material for stereoprojection imaging.

2. Description of Related Arts

The conventional grating and photosensitive material of stereoprojection imaging are combined before projection imaging, and then developed. Because of high crimp ratio of the grating, large developing arrangements must be accompanied, which consumes lotion, time and space greatly. Additionally, the stereopicture developed has high fog density and low contrast, the surface of the grating is easily damaged to affect appearance when developing, and the pre-combined stereo photosensitive material relies on the import and has high cost.

SUMMARY OF THE PRESENT INVENTION

Technical Problem

A technical problem to be solved by the present invention is to overcome the drawback in the prior art that a device for mounting the grating and the photosensitive material is lacked, and provide a device for mounting a grating and a photosensitive material for stereoprojection imaging.

Technical Proposal

In order to solve the technical problem, the present invention provides:

A device for mounting a grating and a photosensitive material for stereoprojection imaging, comprising:
an enlarging-printing platform; and
an exposure head positioned above the enlarging-printing platform;
which is characterized in that:
the enlarging-printing platform is a chamber structure, and has a plurality of suction holes provided on an upper surface thereof and at least one exhaust port provided on a side and connected with an exhaust device;
the device for mounting the grating and the photosensitive material for stereoprojection imaging further comprises a compressing mechanism connected with the upper surface.

Preferably, the suction holes are provided evenly.

Preferably, the compressing mechanism comprises at least two compressing elements mounting on two sides of the upper surface and connected with the upper surface via at least a springing device.

Preferably, the springing device is an electric controlling switch or a pneumatic controlling switch.

Preferably, the compressing elements are compressing bars or compressing blocks.

Preferably, the device for mounting the grating and the photosensitive material for stereoprojection imaging further comprises an assistant compressing mechanism positioned under the exposure head and compressing the grating and the photosensitive material from top to bottom.

Preferably, the assistant compressing mechanism is a pneumatic pen mounted on a frame perpendicularly.

Preferably, the frame has a size adapted to a size of a projection photosensitive area.

Beneficial Effect

The positive beneficial effect of the present invention is as follows. The device for mounting the grating and the photosensitive material provides a real-time composite device for developing stereopictures. With the mounting device according to the present invention, the grating and photosensitive photographic paper need either being combined beforehand, or being developed with the grating after exposure. Therefore, the drawback of high crimp ratio of the grating, high difficulty of developing, bad stereoimaging effect, and high cost is overcome.

BRIEF DESCRIPTION OF THE DRAWINGS

An exploded view of a device for mounting a grating and a photosensitive material for stereoprojection imaging according to a preferred embodiment of the present invention is shown.

DETAILED DESCRIPTION OF THE PREFERRED EMBODIMENT

A preferred embodiment of the present invention is described by accompanied with the drawing.

Referring to the drawing, a device for mounting a grating and a photosensitive material for stereoprojection imaging comprises an enlarging-printing platform 1. The enlarging-printing platform 1 is a chamber structure, has an upper surface 11 for supporting a photosensitive material 10 and a grating 9. A plurality of suction holes 2 are provided on the upper surface 11 evenly. Three exhaust ports 3 are provided on a side of the enlarging-printing platform 1 for connecting with an exhaust device (not shown on the drawing). The exhaust device is connected with the exhaust ports 3 via pipes. Preferred, the pipes can be of elastic property. When using, the photosensitive material 10 covers on the upper surface 11 of the enlarging-printing platform 1 with a side of sensitive layer upward, the exhaust device exhausts air inside the enlarging-printing platform 1 via the exhaust ports 3 to form a negative pressure inside the enlarging-printing platform 1, and the photosensitive material 10 attaches to the upper surface 11 firmly under external atmospheric pressure on an upper side thereof, so as to prevent the photosensitive material 10 from moving during exposure.

The enlarging-printing platform 1 further comprises a compressing mechanism thereabove for compressing the grating 9 and the photosensitive material 10, which comprises two compressing bars 4 adapted to a size of the upper surface 11. At least one springing device 5 is mounted on each of the compressing bars 4, and has a first end mounted on the enlarging-printing platform 1 and a second end passing through the compressing bar 4 perpendicularly and mounting on an upper surface of the compressing bar 4. With the springing device 5, the compressing bars 4 move up and down with respect to the enlarging-printing platform 1. The springing device 5 can be an electric controlling switch or a pneumatic controlling switch.

Before enlarging-printing, the exhaust device and the springing device 5 are actuated to compress the grating 9 and the photosensitive material 10 onto the upper surface 11, and the exhaust device and the springing device 5 can be directly controlled by a computer. After finishing enlarging-printing, the exhaust device is shut down, and the springing device 5 acts to raise the compressing bars 4, so as to detach the grating 9 and the photosensitive material 10 from the upper surface 11. The photosensitive material 10 after exposure is developed solely, and then is combined with the grating 9, so as to overcome the drawback of high crimp ratio of the grating, high difficulty of developing, bad stereoimaging effect, and high cost.

Preferably, to avoid a gap or dislocation on an enlarging-printing area of the grating 9 and the photosensitive material 10, an assistant compressing mechanism is provided under an exposure head 6. The assistant compressing mechanism comprises a frame structure 7, and an area within the frame structure 7 is an exposure area. A plurality of pneumatic pens 8 are perpendicularly mounted on the frame structure 7. Ends of the pneumatic pens 8 are raised up to keep a gap with the upper surface 11 when idle, and the ends of the pneumatic pens 8 extend down to apply on the grating 9 on the upper surface 11 when working.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A device for mounting a grating and a photosensitive material for stereoprojection imaging, comprising:
   an enlarging-printing platform, which is a chamber structure, and has a plurality of suction holes provided on an upper surface thereof and at least one exhaust port provided on a side for connecting with an exhaust device;
   an exposure head positioned above said enlarging-printing platform;
   a compressing mechanism connected with said upper surface; and
   an assistant compressing mechanism positioned under said exposure head for compressing the grating and the photosensitive material from top to bottom,
   wherein said assistant compressing mechanism comprises a frame and a pneumatic pen mounted on said frame perpendicularly.

2. The device, as recited in claim 1, wherein said suction holes are provided evenly.

3. The device, as recited in claim 2, wherein said compressing mechanism comprises: at least one springing device, and at least two compressing elements mounted on two sides of said upper surface and connected with said upper surface via said springing device.

4. The device, as recited in claim 3, wherein said springing device is an electric controlling switch or a pneumatic controlling switch.

5. The device, as recited in claim 4, wherein said compressing elements are compressing bars or compressing blocks.

6. The device, as recited in claim 3, wherein said compressing elements are compressing bars or compressing blocks.

7. The device, as recited in claim 3, wherein said frame has a size adapted to a required size of a projection photosensitive area.

8. The device, as recited in claim 2, wherein said frame has a size adapted to a required size of a projection photosensitive area.

9. The device, as recited in claim 1, wherein said compressing mechanism comprises: at least one springing device, and at least two compressing elements mounted on two sides of said upper surface and connected with said upper surface via said springing device.

10. The device, as recited in claim 9, wherein said springing device is an electric controlling switch or a pneumatic controlling switch.

11. The device, as recited in claim 10, wherein said compressing elements are compressing bars or compressing blocks.

12. The device, as recited in claim 10, wherein said frame has a size adapted to a required size of a projection photosensitive area.

13. The device, as recited in claim 9, wherein said compressing elements are compressing bars or compressing blocks.

14. The device, as recited in claim 13, wherein said frame has a size adapted to a required size of a projection photosensitive area.

15. The device, as recited in claim 9, wherein said frame has a size adapted to a required size of a projection photosensitive area.

16. The device, as recited in claim 1, wherein said frame has a size adapted to a required size of a projection photosensitive area.

* * * * *